June 11, 1968  L. R. VAN ARSDALE  3,387,483
FLOWMETER PROVING APPARATUS
Filed Nov. 5, 1965  2 Sheets-Sheet 2
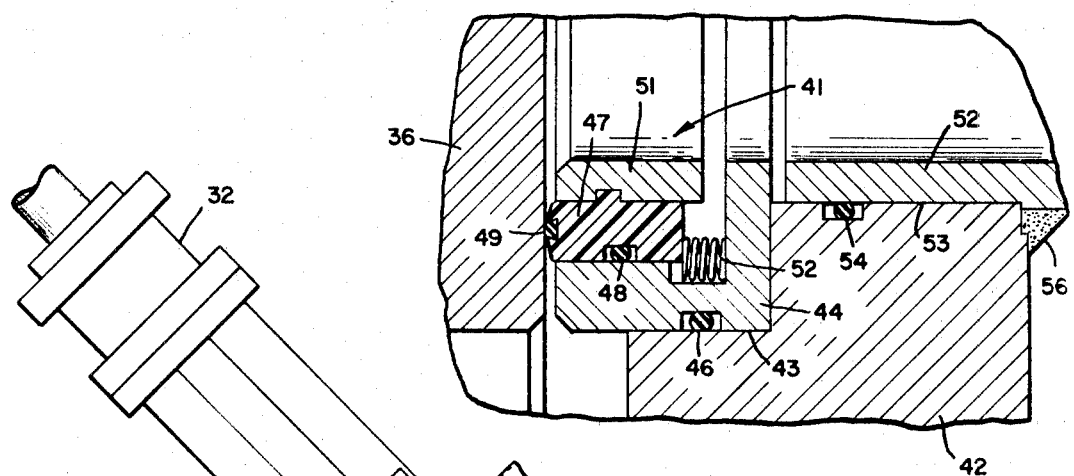
FIG_5
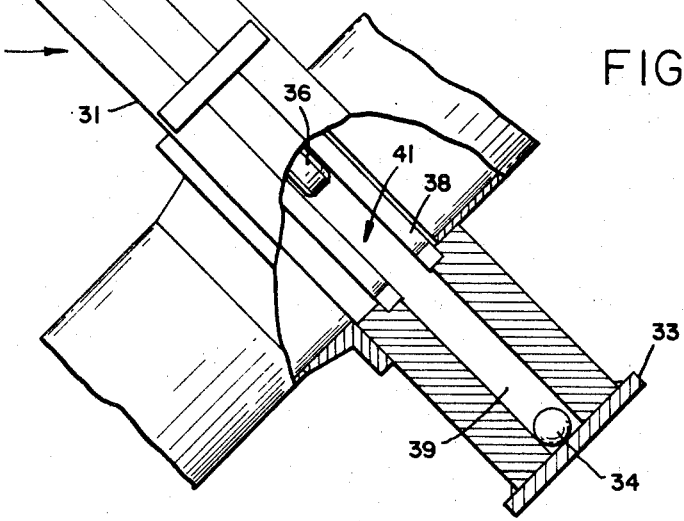
FIG_3
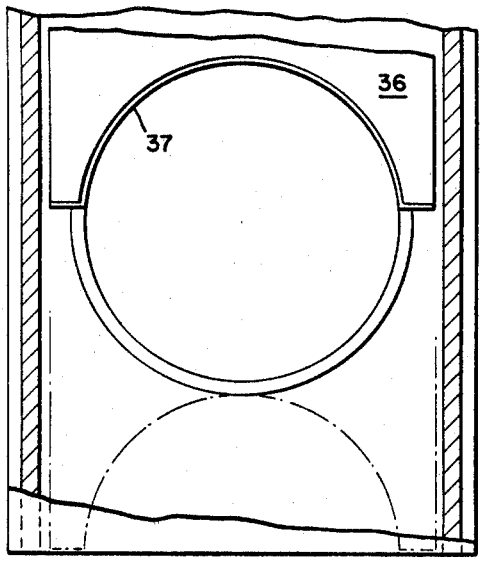
FIG_4
INVENTOR
BY LYLE R. VAN ARSDALE
ATTORNEYS

United States Patent Office 3,387,483
Patented June 11, 1968

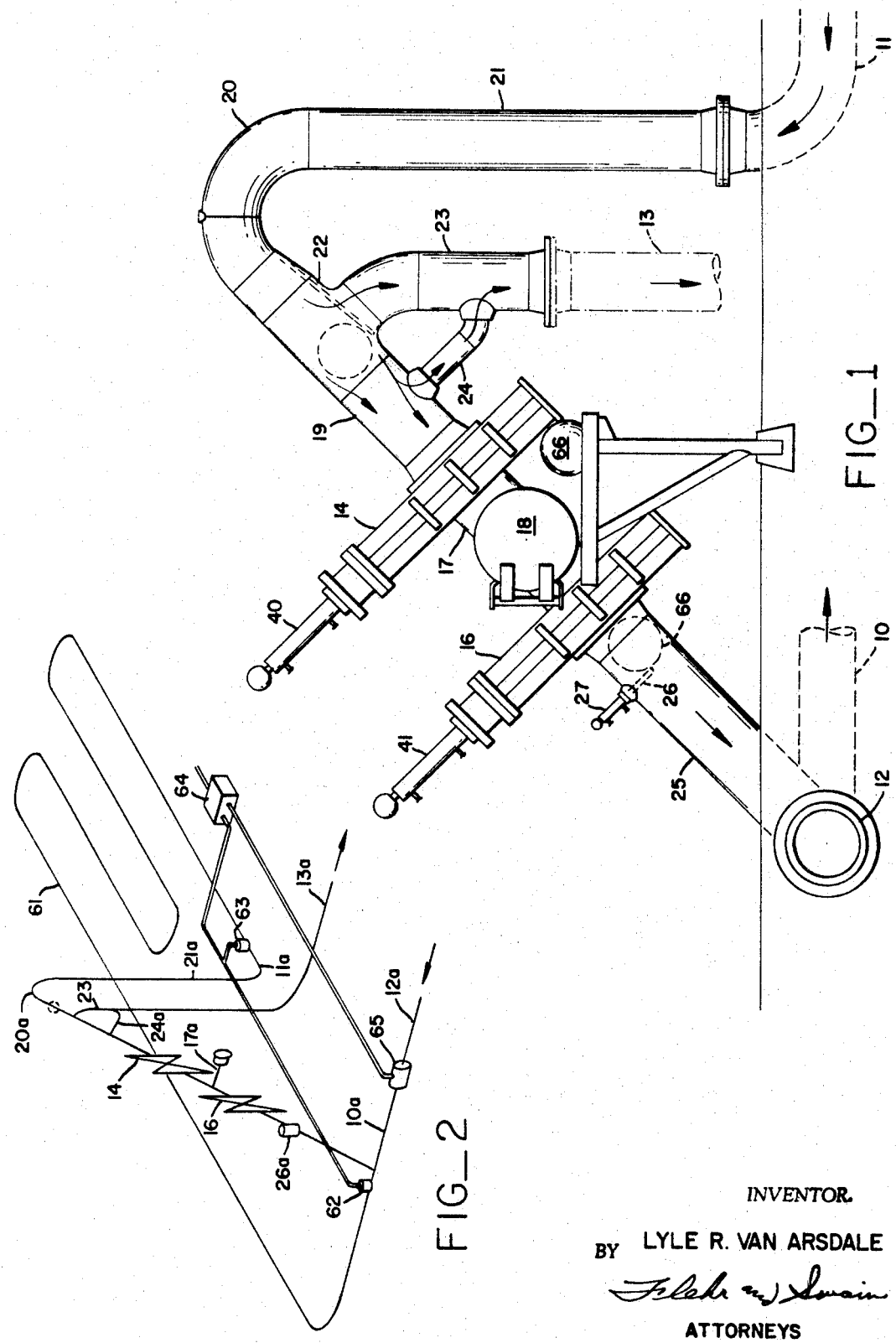

3,387,483
FLOWMETER PROVING APPARATUS
Lyle R. Van Arsdale, Houston, Tex., assignor to M & J Valve Company, Houston, Tex., a corporation of Delaware
Filed Nov. 5, 1965, Ser. No. 506,549
3 Claims. (Cl. 73—3)

ABSTRACT OF THE DISCLOSURE

Meter prover apparatus for measuring liquid flow. Interchange means is provided for removing a sphere from the outlet end of a meter prover loop and introducing it into the inlet end. The interchange means includes gate valves having aligned flow passages inclined to the horizontal (e.g., 45°) and constructed to provide sediment receiving sumps for the removal of foreign solids from the liquid.

---

This invention relates generally to flowmeter proving apparatus such as are employed in conjunction with pipe line transmission systems.

In connection with piping systems for conveying various liquid petroleum products, it is important to provide accurate flowmetering means. The more conventional flowmetering devices such as meters of the positive displacement and turbine types are subject to serious inaccuracies that may be cumulative. Of recent years so-called meter provers have been employed which make accurate periodic checks of the flow for calibration of the flowmeter. One form of meter prover which has been developed (Patent 2,772,561) employs an extended length of metering pipe of uniform internal diameter, which is connected into the main piping system. An interchange connects between the inlet and discharge ends of the metering pipe and is valve controlled to enable a sphere or plug to be launched from the interchange into the inlet end of the pipe, and to be returned to the interchange after it reaches the discharge. By means of an associated electrical system which is activated when the sphere passes through detecting points near the inlet and discharge ends, a flow meter reading is obtained for the time interval required for the travel of the sphere between the detecting points. This reading is then compared with the known calculated volume of the metering pipe between the detecting points, to provide accurate calibration data. As previously constructed, the interchange commonly consists of a vertical valve controlled passage connected at its ends to the inlet and discharge ends of the metering pipe, whereby a sphere released in the passage falls by gravity to the inlet end of the metering pipe.

It is well known that piping systems for petroleum products are subject to abrasive solids carried by the liquid. With a conventional meter prover, some such solids find their way into the interchange means and then back into the metering pipe. This is objectionable because the return of such foreign material into the metering pipe tends to interfere with free frictionless movement of sphere, and because such solids tend to cause abrasion of the valve sealing means employed.

In general, it is an object of the present invention to provide meter proving apparatus which avoids the difficulties of prior apparatus of this character as pointed out above, and which in particular will avoid passing foreign solids through the interchange into the inlet end of the metering pipe.

Another object of the invention is to provide a meter proving apparatus which makes use of a particular type of gate valve in a particular manner, whereby one end of the valve body serves as a sump for collecting foreign material.

Another object of the invention is to provide improved apparatus of the above character characterized by the fact that foreign material is not permitted to lodge on the valve sealing surfaces of the valves employed for controlling the interchange, and therefore these valves can be operated without abrasion.

Additional objects and features of the invention will appear from the following description in which the preferred embodiment has been set forth in detail in conjunction with the accompanying drawing.

Referring to the drawing:

FIGURE 1 is an end view of a meter prover interchange means, together with associated parts of the piping with which the interchange is employed;

FIGURE 2 is a schematic view in perspective illustrating complete meter prover apparatus as connected in a piping system, and which utilizes the interchange means of FIGURE 1;

FIGURE 3 is detail in side elevation showing one of the gate valves employed with the interchange means;

FIGURE 4 is a cross-sectional view taken along the line 4—4 of FIGURE 3; and

FIGURE 5 is a detail in section showing suitable sealing means for the gate valve of FIGURE 3.

Referring to the drawing, pipe 10 is connected to one end of a metering pipe of prover loop. The other end of the metering pipe or prover loop is connected to the pipe 11. It is assumed in this instance that the metering pipe is underground, and therefore the connecting pipes 10 and 11 are indicated as subterranean. Flange coupling 12 represents means for making connection with the main system piping, and liquid passing through the metering pipe is ultimately returned to the main system by way of pipe 13.

The interchange means itself consists of a pair of gate valves 14 and 16 which are interconnected by the T 17. The side branch of this T is provided with a readily removable closure 18 by means of which a sphere can be introduced or removed from the system. For a reason to be presently explained, both the gate valves 14 and 16 are inclined to the vertical, in this instance at an angle of about 45°. The upper side of gate valve 14 is connected by pipe section 19 with the pipe bend 20 and vertical pipe section 21, thus making connection with the pipe 11. The internal diameter of bend 20 and pipe section 21 is substantially that of the metering pipe, whereas pipe section 19 has a somewhat larger internal diameter.

The lower side of pipe section 19 is provided with the grating 22, and there is free communication through this grating with the upper end of the discharge pipe 23, which makes direct connection with the pipe 13. Also a bypass pipe 24 can be provided between the lower side of pipe section 19 and pipe section 23.

The lower side of gate valve 16 is connected by pipe section 25 with the pipe 10 and the passage through flange coupling 12. Within the pipe section 25, near the gate valve 16 there is a sphere retaining pin 26 which is operably attached to the external operating means 27, whereby it can be retracted or projected into the sphere engaging position illustrated. Operator 27 may be of the hydraulic cylinder type.

The two gate valves 14 and 16 can be of substantially the same construction. Referring to FIGURE 3, the body 31 of valve 16 is of fabricated construction, and is rectangular or box-like in transverse section. Suitable bonnet means 32 is mounted upon the upper end of the body, and the lower end or lower extension 33 of the body is shown provided with one or more cleanout plugs 34. The internal gate 36 is provided with flat parallel sides and has a lower end portion which is cut away along the arc of a circle as indicated at 37. Sealing assemblies 38 are carried by the body and serve to establish sealing relationship between the body and the sides of the gate. When such a valve is in the full open position as illustrated in solid lines in FIGURES 3 and 4, it will be evident that the space in the lower extension 33 of the body forms a sump which is in free unrestricted communication with the flow passage 41 through the valve, such communication extending over more than 180° about the lower side of the flow passage, and extending upwardly from the lower side to the lower extremities of the gate 36. Thus foreign material carried by the oil passing through the flow passage 41 tends to drop into the space 39 where such material accumulates for occasional removal.

Full closed position of the gate is shown in dotted lines in FIGURE 4. Assuming the collection of some foreign solids in the space 39, their presence will not interfere with movement of the gate to full closed position.

Both gate valves are provided with suitable operating means, such as the hydraulic cylinder operators 40 and 41.

FIGURE 5 shows suitable sealing means which can be used with the gate valves. The wall portion 42 is one of the end walls of the body, and it is provided with the annular recess 43 to accommodate annular sealing assembly. The assembly consists of the metal mounting ring 44 which is accommodated within the recess 43 and is sealed with respect to the body portion 42 by the seal means 46 of the O-ring type. An annular seal member 47 made of suitable relatively hard non-metallic resilient material like nylon is slidably fitted within the mounting ring 44 and sealed with respect to the same by the seal means 48 of the O-ring type. The end face of the seal ring 47 which engages the valve gate 36 is provided with a bonded-in insert 49 formed of relatively softer non-metallic resilient material, such as a synthetic rubber or elastomer. The seal ring 47 is secured to a metal carrier ring 51. The compression springs 52 are carried by the mounting ring 44 and act upon the base of the seal ring 47 to urge it against the valve working surface of the gate 36.

The connecting pipe section 52 can be fitted within the bore 53 formed in the wall portion 42 and sealed with respect thereto by the seal means 54 of the O-ring type. Also these parts are secured together by welding 56.

The sealing means described above is disclosed and claimed in U.S. Patent 3,269,695, dated Aug. 30, 1967. It has a number of features which make it particularly desirable for use in connection with the present invention. Particularly, such a sealing means maintains a good fluid-tight seal for lack of the gate valves, such as is necessary for proper operation of the interchanger. In addition, the valve working surfaces of the gate come into contact with the metal surfaces of the mounting rings 44 only under conditions of substantial differential pressure when the valve is in a closed position. Therefore, the valve working surfaces of the gate contact only non-metallic material during most of its operating movements, and this tends to reduce wear.

The complete apparatus illustrated schematically in FIGURE 2 is as follows: Pipe lines 12a and 13a are connected to a main pipe system whereby the main flow occurs through these pipe lines as indicated by the arrows. Line 12a corresponds to the line connected to the coupling flange 12, while line 13a represents the discharge line 13. Line 61 represents the metering pipe or prover loop, and its inlet and discharge ends 10a and 11a make connection respectively with the lines 12a and 13a. Part 17a represents the charging T 17, and device 26a represents the sphere retaining pin 26. Devices 62 and 63 represent conventional sphere detecting devices such as are associated with the pipe at the stations indicated and electrically connected to an electronic counter or register 64. Device 65 is inserted between lines 10a and 12a, and is a flowmeter provided with an electronic tachometer, whereby it supplies pulses to the counter 64 at a rate depending upon the velocity of flow. The hydraulic cylinders 40 and 41 for the gate valves 14 and 16, and the cylinder 27 for the retaining pin 26 are connected to a suitable hydraulic system for selective operation.

Operation of the complete apparatus is as follows: It is assumed that the apparatus has been properly filled with liquid, and that the valves 14 and 16 are closed. Liquid is drained from the T 17, and closure 18 is opened to admit the sphere 66. With the volume of the metering pipe between the detecting station being known, comparisons with the meter readings makes possible accurate calibrations. After the T 17 has been closed, it is filled with liquid, and the valve 16 opened to permit the sphere to pass through this valve to a position against the detent pin 26 as illustrated in dotted lines in FIGURE 1. Valve 16 is then closed. To start a metering run, the cylinder 27 is actuated by application of hydraulic fluid to retract the pin 26, thus permitting the sphere 66 to drop down by gravity and be carried by the fluid flow into the inlet end of the metering pipe 61. As the sphere passes the detecting device 62, the counter or register 64 is actuated. The sphere moves with the flow through the metering loop, and eventually passes adjacent the detecting device 63 which thereupon applies an electrical pulse to the counter 64. Thereafter the sphere passes through the pipe 21, through the bend 20, and then into the larger pipe section 19. It passes over the grating 22 to eventually come to rest upon the upstream side of the gate valve 14. During a metering run and thereafter, flow occurs continuously through the metering pipe and back into the main piping system through the discharge 13. The sphere can be returned to the T 17 simply by opening valve 14 while valve 16 is closed.

It will be evident from the above that I have provided meter proving apparatus having a number of desirable features. The inclined gate valves 14 and 16 and their associated piping provide an interchanger which permits proper launching of the spheres by gravity, while at the same time effectively trapping and retaining foreign solids. Thus the amount of foreign solids finding their way into the metering pipe is at a minimum, which is conducive to proper frictionless movement of the sphere with the liquid flow. In addition, because abrasive solids are trapped in the valve bodies, the sealing means of the valves are not subject to the abrasive action of such solids, with the result that a good seal is maintained with a minimum amount of servicing and repair. The location of the pin 26 near the lower side of valve 16 is desirable because it permits both valves 14 and 16 to be closed before the sphere is released. Thus the distance from the valve 12 to the detecting device 62 may be made relatively short.

While particular reference has been made to petroleum products, the invention is deemed applicable to a variety of liquids such as are handled in transmission lines.

I claim:

1. In meter proving apparatus for measuring liquid flow through piping systems, a metering pipe having inlet and discharge ends, said pipe being adapted to receive a flow propelled sphere, and means forming an interchange between the inlet and discharge ends of said metering pipe for transferring a sphere from the outlet end into the inlet end, said means comprising at least one gate valve having a flow passage through the same when open and piping connecting the flow passage to the inlet and outlet ends of the metering pipe, the gate valve having its flow axis inclined to the horizontal at an angle of less than 90° and having upper and lower body portions extending above and below the flow passage through the same, the space within the lower body portion forming a depending sediment receiving sump that is in free unrestricted communication with the lower side of the flow passage for open position of the valve, such communication extending across the entire diameter of the passage.

2. In metering apparatus for measuring liquid flow through piping systems, a metering pipe having inlet and discharge ends and forming a continuous flow passage, said metering pipe being adapted to receive a flow propelled sphere, and means forming an interchange between the inlet and discharge ends of the metering pipe for transferring a sphere from the discharge end into the inlet end, said means comprising two gate valves, a T between the gate valves and serving to connect the same, said gate valves having axially aligned flow passages and being positioned whereby the axes of said flow passages is inclined to the horizontal at an angle of less than 90°, each of said gate valves having upper and lower body portions extending above and below the flow passage through the same at an angle of 90° to the axes of said flow passages, the spaces within the lower body portions forming depending sumps that are in free unrestricted communication with the corresponding lower sides of the flow passages for open position of the valve, each such communication extending across the entire diameter of the corresponding passage, such spaces serving to receive and retain solids from liquid in the interchange, and piping serving to connect said gate valves to the inlet and discharge end portions of the metering pipe.

3. Metering apparatus as in claim 2 together with a retractable sphere engaging pin disposed within said last-named piping adjacent the lower side of the lower most one of said gate valves.

References Cited

UNITED STATES PATENTS

| | | | |
|---|---|---|---|
| 2,772,561 | 12/1956 | Plank et al. | 73—3 |
| 2,948,144 | 8/1960 | Applequist | 73—3 |
| 3,063,079 | 11/1962 | Bergman et al. | 251—326 |
| 3,158,888 | 12/1964 | Ericson | 15—104.06 |
| 3,186,014 | 6/1965 | Allen | 73—3 |
| 3,220,432 | 11/1965 | Allen | 137—268 |
| 3,224,247 | 12/1965 | Barrett | 73—3 |
| 3,246,666 | 4/1966 | Park et al. | 73—3 |
| 3,261,048 | 7/1966 | Ericson | 15—104.06 |
| 3,266,077 | 8/1966 | Elliott et al. | 137—268 |
| 3,295,357 | 1/1967 | Halpine et al. | 73—3 |
| 3,295,546 | 1/1967 | Carlton | 251—326 |

FOREIGN PATENTS 703,609   2/1965   Canada.

DAVID SCHONBERG, *Primary Examiner.*

LOUIS R. PRINCE, *Examiner.*

NEIL B. SIEGEL, *Assistant Examiner.*